(12) United States Patent
Alves et al.

(10) Patent No.: US 11,750,031 B2
(45) Date of Patent: Sep. 5, 2023

(54) INDUCTIVE CHARGER WITH ROTATABLE MAGNETIC MOUNT

(71) Applicant: Scosche Industries, Inc., Oxnard, CA (US)

(72) Inventors: Kasidy Alves, Oxnard, CA (US); Kevin Trejo, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 309 days.

(21) Appl. No.: 17/234,125

(22) Filed: Apr. 19, 2021

(65) Prior Publication Data

US 2021/0242696 A1    Aug. 5, 2021

Related U.S. Application Data

(63) Continuation of application No. 16/238,379, filed on Jan. 2, 2019, now Pat. No. 11,011,921.

(60) Provisional application No. 62/787,154, filed on Dec. 31, 2018.

(51) Int. Cl.
*H02J 7/00* (2006.01)
*H02J 50/10* (2016.01)
*H04M 1/02* (2006.01)

(52) U.S. Cl.
CPC .............. *H02J 50/10* (2016.02); *H02J 7/00* (2013.01); *H02J 7/0044* (2013.01); *H04M 1/0202* (2013.01)

(58) Field of Classification Search
None
See application file for complete search history.

(56) References Cited

U.S. PATENT DOCUMENTS

| 3,329,277 A | 7/1967 | Gaudino |
| 3,642,122 A | 2/1972 | Von Ende |
| D306,396 S | 3/1990 | Brushaber |

(Continued)

FOREIGN PATENT DOCUMENTS

| CN | 201113495 Y | 9/2008 |
| CN | 202042680 U | 11/2011 |

(Continued)

OTHER PUBLICATIONS

The Original iMagnet Cradle-Less Universal Car Phone Windsheild Dashboard Mount Holder for iPhone 6, 6 Plus, 6S, 6S Plus, 5S 5, Galaxy S6 S5, Note 5 4 3, With Offical iMagnet Logo, iMagnet, Amazon.com, Aug. 19, 2012.

(Continued)

*Primary Examiner* — Arun C Williams
(74) *Attorney, Agent, or Firm* — STETINA BRUNDA GARRED & BRUCKER (57) ABSTRACT

A magnetic mount for an electronic device with an inductive charging receiver and one or more engagement points. The mount has a static inductive charging head with an inductive coil delivering a charging current to the electronic device with the inductive charging receiver being in axial alignment with the inductive coil. A back plate with a circular frame is in rotating engagement with the static inductive charging head. The back plate also include one or more magnet support arms on which permanent magnets are mounted to magnetically couple with the one or more engagement points on the electronic device.

19 Claims, 6 Drawing Sheets

(56) References Cited

U.S. PATENT DOCUMENTS

| | | |
|---|---|---|
| D317,697 S | 6/1991 | Lage |
| D327,840 S | 7/1992 | Askew |
| 5,213,240 A | 5/1993 | Dietz et al. |
| 5,369,565 A | 11/1994 | Chen et al. |
| D362,230 S | 9/1995 | Yokozawa |
| D362,657 S | 9/1995 | Tomikawa et al. |
| D398,796 S | 9/1998 | Fauchald et al. |
| 5,992,807 A | 11/1999 | Tarulli |
| 6,075,499 A | 6/2000 | Edwards et al. |
| 6,076,790 A | 6/2000 | Richter |
| 6,135,408 A | 10/2000 | Richter |
| 6,149,116 A | 11/2000 | Won |
| 6,305,656 B1 | 10/2001 | Wemyss |
| 6,382,482 B1 | 5/2002 | Chao |
| 6,502,727 B1 | 1/2003 | Decoteau |
| 6,594,051 B1 | 7/2003 | Chaplin et al. |
| D479,196 S | 9/2003 | Shih |
| D489,578 S | 5/2004 | Lai |
| 6,888,940 B1 | 5/2005 | Deppen |
| 7,021,593 B1 | 4/2006 | Fan |
| D521,850 S | 5/2006 | Richter et al. |
| D530,333 S | 10/2006 | Richter |
| D543,439 S | 5/2007 | Brassard |
| D551,058 S | 9/2007 | Carnevali |
| D552,454 S | 10/2007 | Fynn |
| D553,959 S | 10/2007 | Brassard |
| D554,042 S | 10/2007 | Richter |
| D554,491 S | 11/2007 | Stenberg |
| 7,296,771 B2 | 11/2007 | Kalis et al. |
| D560,592 S | 1/2008 | Brassard |
| D563,309 S | 3/2008 | Richter |
| D565,937 S | 4/2008 | Tsai |
| 7,374,142 B2 | 5/2008 | Carnevali |
| D570,836 S | 6/2008 | Chen |
| D576,865 S | 9/2008 | Chiang et al. |
| 7,431,251 B2 | 10/2008 | Carnevali |
| D588,903 S | 3/2009 | Carnevali |
| D590,835 S | 4/2009 | Richter |
| D592,205 S | 5/2009 | O'Brien |
| D600,991 S | 9/2009 | Lai |
| D603,322 S | 11/2009 | Nicieja |
| D609,644 S | 2/2010 | Lin |
| D638,008 S | 5/2011 | Richter |
| 8,016,255 B2 | 9/2011 | Lin |
| D654,874 S | 2/2012 | Au |
| D656,465 S | 3/2012 | Au |
| D656,899 S | 4/2012 | Webb et al. |
| D670,157 S | 11/2012 | Mo |
| D671,074 S | 11/2012 | Hori et al. |
| D677,709 S | 3/2013 | Skeoch et al. |
| D681,867 S | 5/2013 | Wegger et al. |
| D686,595 S | 7/2013 | Andre et al. |
| 8,496,222 B2 | 7/2013 | Li |
| D687,441 S | 8/2013 | Janzen |
| D694,249 S | 11/2013 | Akana et al. |
| D700,175 S | 2/2014 | Ohm |
| D705,211 S | 5/2014 | Huang |
| D709,066 S | 7/2014 | Byun |
| D709,072 S | 7/2014 | Askew-Harris et al. |
| D713,398 S | 9/2014 | Alesi et al. |
| D715,132 S | 10/2014 | McSweyn et al. |
| D718,612 S | 12/2014 | McSweyn et al. |
| D719,959 S | 12/2014 | Vogel |
| 9,853,507 B2 | 12/2017 | Jol et al. |
| 10,215,230 B2 * | 2/2019 | Iannello .............. F16C 32/0677 |
| 10,778,020 B1 | 9/2020 | Torem |
| 2005/0075700 A1 | 4/2005 | Schommer et al. |
| 2005/0092875 A1 | 5/2005 | Carnevali |
| 2006/0290654 A1 | 12/2006 | Wang |
| 2007/0002533 A1 | 1/2007 | Kogan et al. |
| 2007/0018064 A1 | 1/2007 | Wang |
| 2008/0023606 A1 | 1/2008 | Kalis et al. |
| 2009/0134838 A1 | 5/2009 | Raghuprasad |
| 2010/0033127 A1 | 2/2010 | Griffin, Jr. et al. |
| 2010/0156345 A1 | 6/2010 | Phelps, III |
| 2010/0238655 A1 | 9/2010 | Sloan et al. |
| 2011/0074344 A1 | 3/2011 | Park et al. |
| 2011/0192857 A1 | 8/2011 | Rothbaum et al. |
| 2011/0241608 A1 | 10/2011 | Adamczyk et al. |
| 2012/0229300 A1 | 9/2012 | Fu |
| 2012/0292463 A1 | 11/2012 | Burns |
| 2012/0295451 A1 | 11/2012 | Hyun-Jun et al. |
| 2013/0043827 A1 | 2/2013 | Weinstein et al. |
| 2013/0154566 A1 | 6/2013 | Emslie |
| 2013/0157483 A1 | 6/2013 | Yu et al. |
| 2013/0187020 A1 | 7/2013 | Trotsky |
| 2014/0346295 A1 | 11/2014 | Song |
| 2014/0357094 A1 | 12/2014 | Kim |
| 2014/0368163 A1 | 12/2014 | Ho |
| 2015/0207351 A1 | 7/2015 | Hamburgen et al. |
| 2015/0288205 A1 | 10/2015 | Weinstein et al. |
| 2017/0033579 A1 | 2/2017 | Maguire et al. |
| 2017/0104297 A1 | 4/2017 | Scott et al. |
| 2017/0214260 A1 | 7/2017 | Kim |
| 2017/0271900 A1 | 9/2017 | Rose et al. |
| 2017/0288469 A1 | 10/2017 | Murashige et al. |
| 2017/0317444 A1 | 11/2017 | Narayanasamy et al. |
| 2017/0346317 A1 | 11/2017 | Hodges et al. |
| 2018/0025826 A1 | 1/2018 | Nishimura et al. |
| 2018/0335201 A1 | 11/2018 | Redpath et al. |
| 2019/0140471 A1 | 5/2019 | Johanski et al. |
| 2019/0341791 A1 | 11/2019 | Grifoni |
| 2021/0305825 A1 * | 9/2021 | Zheng ..................... H02J 50/10 |

FOREIGN PATENT DOCUMENTS

| | | |
|---|---|---|
| CN | 203193688 U | 9/2013 |
| CN | 203416030 U | 1/2014 |
| CN | 206195404 U | 5/2017 |
| CN | 108306391 A | 7/2018 |
| JP | 2000231910 A | 8/2000 |
| KR | 101718729 B1 | 3/2017 |
| KR | 101790891 B1 | 10/2017 |
| WO | 2017069326 A1 | 4/2017 |

OTHER PUBLICATIONS

Mounts posted by Scoshe found on Sep. 27, 2016 at http://www.scosche.com/consumer-tech/mounts.

Magnetic Nanopori links phones to accessories, cars, each other; Jan. 7, 2014 http://www.cnet.com/news/magnetic-nanoport-links-phones-to-accessories-cars-each-other/.

Clever smadphone case offers an ingenious way to charge your phone on the go; Jun. 20, 2014 http://bgr.com/2014/06/20/best-smariphone-accessories-zolo/.

Logitech Case+ Review: Brilliant iPhone Case Concept, Flawed Execution; May 13, 2014 http://time.com/98112/logitech-case-plus-review/.

International Search Report & Written Opinion for Application No. PCT/US2019/068589; dated Mar. 19, 2020.

European Search Report and Opinion for Application No. EP19214118 (dated Mar. 19, 2020).

* cited by examiner

INDUCTIVE CHARGER WITH ROTATABLE MAGNETIC MOUNT

CROSS-REFERENCE TO RELATED APPLICATIONS

This application is a continuation of U.S. patent application Ser. No. 16/238,379 filed Jan. 2, 2019 which relates to and claims the benefit under 35 U.S.C. § 119(e) to U.S. Provisional Patent Application No. 62/787,154 filed Dec. 31, 2018 and entitled "INDUCTIVE CHARGER WITH ROTATABLE MAGNETIC MOUNT," the entire contents of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to mounts for securing mobile electronic devices and chargers for batteries of mobile electronic devices. More particularly, the present disclosure relates to inductive chargers with a rotatable magnetic mount.

2. Related Art

A wide variety of portable electronic devices are currently in existence on the market, though there has been a recent convergence towards a fewer category of devices that fulfill many needs. Typically, these are smartphones that which integrate functions and features that may have earlier been provided in separate, independent devices such as music players, gaming consoles, personal digital assistants, digital still and video cameras, electronic readers, mapping and navigation devices, and so on. Several short-to-medium range communications modalities are also integrated, including WiFi and Bluetooth for short-range/local data transfer links, as well as cellular communications systems implementing such standards as GSM (Global System for Mobile Communications), EDGE (Enhanced Data Rates for GSM Evolution), LTE (Long Term Evolution) and the like that can substantially extend its communicative range.

As with any electronic device, continuing functioning depends on the availability of a power source, and so smartphones incorporate an onboard battery. Such batteries may either be removable or permanently installed and have power capacities that accommodate active use extending a few hours, and standby operation for over an entire day. In order to recharge these batteries, smartphones incorporate on-board charging circuits connectible to an external power supply, which may range from the electrical power grid, a battery/electrical system of a vehicle, to a portable external battery, among others.

A variety of connection modalities between the smartphone and an electrical power source are known in the art. One of the simplest is an AC (alternating current) power adapter with a coaxial connector plug that is received within a corresponding socket on the device. Depending on the needed current capacity, the size and shape of the plug and sockets may be varied. This variety and lack of standardization amongst manufacturers led to the proliferation of numerous proprietary, manufacturer-specific connectors and adapters that were not compatible with other devices with similar power requirements. Accordingly, there has been a drive towards standardizing power connections for portable electronic devices.

Most manufacturers now utilize Universal Serial Bus (USB) connectors to supply power to its devices. The USB standard, as well as its associated connector configurations, have evolved over many years, and different generations of connectors are in current use. A USB interconnection is comprised of a plug that is receptively engaged in a socket, though the shape and sizes of these connectors differ depending on type. Although USB is primarily a data transfer link, the standard defines one line for supplying 5V DC (direct current) power at different current levels, allowing for the standardization of chargers and connector cables that are manufacturer and device-agnostic. In other words, any standard USB cable can be used to connect to any USB port, whether that USB port is incorporated into an AC adapter plugged into a wall socket, a cigarette lighter adapter plugged into a 12V vehicle socket, or a portable battery—a consistent voltage and power can be expected to be delivered to the connecting device. The adapter end is oftentimes a USB type-A connector, while the smartphone-end is typically a smaller footprint connector such as a Micro B connector, or a type C connector For the most part, connecting a charging cable to smartphone is a relatively trivial manual step. However, there may be a number of limitations that can become substantial user experience deficiencies over repeated encounters therewith. One is that most USB connectors are directional, that is, the plug must be oriented in the same direction as the socket, otherwise it cannot be inserted. USB charging cables also share the limitations common across all cable or wire-based connections in that unsightly cables must be positioned to be readily accessible, even when not in use.

As a response to these deficiencies, inductive charging was developed. On the charger end, there is an induction coil that is connected to power source and generates an electromagnetic field. This electromagnetic energy is captured by a corresponding induction coil on the electronic device, and passed to the charging circuit without requiring an electrical connection. The Qi charging standard governs the operating parameters and configuration of the device-end and charger-end inductive couplings.

Whether using a wireless inductive charging modality like Qi, or a wired charging modality over a USB cable, the smartphone is typically laid horizontally on a flat surface without being actively operated or viewed. When interacting with the smartphone for a brief moment, it may be held in the hand and placed back down following use. However, there may be some situations in which the user is performing a primary task not with or relating to the smartphone, e.g., driving a vehicle, working on a computer, cooking, and so on, but would nevertheless desire to access a function or view something on the smartphone.

In response to these needs, various mounting devices have been developed. One configuration is a cradle that mechanically retains the smartphone, with the cradle being mounted to a surface via suction cup, adhesive, or other attachment modality. The compressive retention mechanisms are oftentimes cumbersome to engage and/or disengage, particularly when coupled with the need to connect the charging cable. More recently, magnetic mounts are being utilized, where a mount head including one or more permanent magnets are fixed to a surface, with a metallic plate being attached to the rear of the smartphone. The magnets on the mount engage the metallic plate, thereby releasably engaging the smartphone to the mount.

The charging coil in smartphones incorporating inductive charging functionality occupies much of the real estate on the backside of its body. With additional features such as the rear facing camera (which may include two, possibly more lenses), along with a flash or illumination unit, there may be a reduced area in which the metallic plate, which must be of a sufficient size for the permanent magnet to hold the entire weight of the smartphone, to be attached. The space is also limited with respect to the specific location of the body, as the charging coil occupies a central region that is idea for mounting the plate in a manner that facilitates the most balanced attachment to the magnetic head. Thus, the plate must be placed in off-center areas, resulting in less optimal mounting engagements. Furthermore, although conventional smartphone devices are capable of sensing its orientation and adjusting the display to landscape or portrait views depending on the detected orientation, mounting the smartphone to the head at off-center locations precludes switching to a different orientation, typically the horizontal orientation.

Accordingly, there is a need in the art for an improved magnetic smartphone mount that incorporates inductive charging features. There is also a need in the art for such magnetic mounts to be rotatable, and freely switch between different device orientations. In short, there is a need for an inductive charger with a rotatable magnetic mount.

BRIEF SUMMARY

The present disclosure contemplates various embodiments of an inductive charger rotatable dock. The dock may include a stator cap with a structural mount interface attached thereto. Additionally, the dock may include a rotor frame with a circular bearing defined by a central opening. The rotor frame may also have a pair of opposed magnet support arms extending radially from the circular bearing. There may be a stator base to which the rotor frame is rotatably engaged within the circular bearing thereof. The stator base may be coupled to the stator cap through the central opening of the rotor frame. The sock may also include an inductive charging coil mounted to the stator base. Additionally, there may be one or more permanent magnets mounted to each of the pair of opposed magnet support arms.

Another embodiment contemplates a magnetic mount for an electronic device with an inductive charging receiver and one or more engagement points. The mount may include a static inductive charging head with an inductive coil delivering a charging current to the electronic device with the inductive charging receiver being in axial alignment with the inductive coil. The mount may also include a back plate with a circular frame in rotating engagement with the static inductive charging head. The back plate may also include one or more magnet support arms on which permanent magnets are mounted to magnetically couple with the one or more engagement points on the electronic device.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of an inductive charger rotatable dock and is not intended to represent the only form in which it can be developed or utilized. The description sets forth the functions for developing and operating the dock in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, left, right, and the like are used solely to distinguish one from another element without necessarily requiring or implying any actual such relationship or order between such elements.

Figures 1, 2, 3:
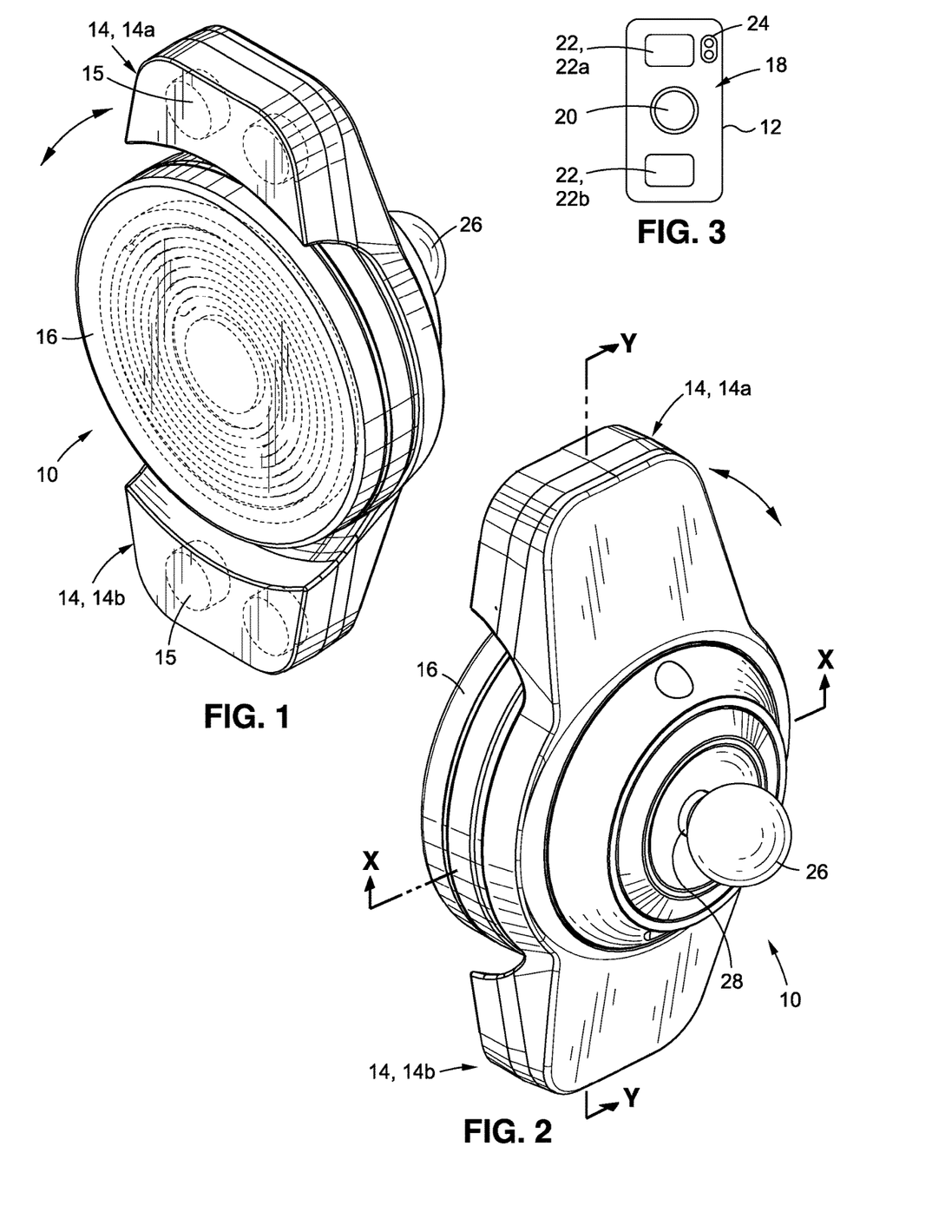
FIG. 1 is a front perspective view of an inductive charger rotatable dock in accordance with one embodiment of the present disclosure.
FIG. 2 is a rear perspective view of the inductive charger rotatable dock shown in FIG. 1.
FIG. 3 is a rear plan view of an exemplary mobile device including an inductive charging receiver and mount engagement points that may be mounted to the inductive charger rotatable dock in accordance with various embodiments of the present disclosure.

FIGS. 1 and 2 show the front and the rear, respectively, of one embodiment of an inductive charger rotatable dock 10 to which a mobile device 12 as shown in FIG. 1 may be mounted. The dock 10 is generally comprised of a pair of cradle arms 14 including a first or upper cradle arm 14a, and a second or lower cradle arm 14b that are each include magnets 15, along with an inductive charging head 16. Referring to the cradle arms 14 as specifically the upper cradle arm 14a or the lower cradle arm 14b is for purposes of consistency and convenience only, as they are configured to be fully rotatable according to the various embodiments of the present disclosure.

The mobile device 12 is understood to be a smartphone and is characterized by a body with a flat rear face 18, as shown. Underneath an outer cover of the mobile device 12, and centrally located in the body may be an inductive charging receiver 20 that, when electromagnetically coupled with a corresponding coil of the inductive charging head 16, transfers electrical energy to charge the onboard battery of the mobile device 12 or to otherwise provide power thereto.

According to one embodiment, the charging modality implemented by the dock 10 and the mobile device 12 is in accordance with the open Qi specification for wireless power transfer as set by the Wireless Power Consortium. In this regard, the dock 10 may be configured as a base station with a system unit that controls a power conversion unit and a communications and control unit that regulates the output electrical signal to an inductive charging coil based upon requests from the receiving mobile device 12. Further, the mobile device 12 is understood to include a power pick-up unit with a secondary coil electrically connected to a battery or other load. The power pick-up unit may be connected to a communications and control unit that regulates the power transferred to the load. Up to ten (10) watts of power may be delivered to the receiving mobile device 12. Because a Qi charger implementation is well known in the art, additional details thereof will be omitted. It will be appreciated that the inductive charging head 16 need not conform to the Qi standard, and any other wireless power transfer modality may be substituted without departing from the scope of the present disclosure.

The mobile device 12 includes one or more magnetic mount engagement points 22, and the exemplary configuration shown includes a first or upper magnetic mount engagement point 22a and a second or lower magnetic mount engagement point 22b. These magnetic mount engagement points 22 are understood to interact with the magnets 15 in the cradle arms 14 to mechanically retain, hold, or otherwise mount the mobile device 12 to the dock 10. In the example illustrated, the magnetic mount engagement points 22 are ferromagnetic plates that are affixed to the rear face 18 via an adhesive strip. Alternative attachment modalities such as glue, solder, or the like may be utilized, though because the plates are installed by a user as an aftermarket accessory, simpler securement methods may be preferable. Although no known current manufacturer of mobile devices 12 incorporate magnetic mount engagement points 22, it is also possible for the cover to include specifically positioned metal sections that may serve as the magnetic mount engagement points 22.

The magnetic mount engagement points 22 or plates may be fixed to the rear face 18 to be in alignment with the magnets 15 within the cradle arms 14. Thus, the vertical separation between the first or upper magnetic mount engagement point 22a and the second or lower magnetic mount engagement point 22b may be the same or similar separation between the first or upper cradle arm 14a and the second or lower cradle arm 14b. The specific separation distance between the first or upper magnetic mount engagement point 22a and the second or lower magnetic mount engagement point 22b may be varied, though preferably, they should not overlap with the inductive charging receiver 20 to avoid electromagnetic interference with the inductive charging head 16 while in operation. Additionally, the rear face 18 may include other features such as camera lenses 24, flash/illumination units, and so forth that should likewise be avoided when placing the plates. In this regard, different templates to guide the positioning of the plates may be provided therewith, since the specific available space on the rear face 18 of the mobile device 12 may differ from one to the other.

Although the various embodiments will be described as a dock for a smartphone, this is by way of example only and not of limitation. Any other suitable electronic device having at least the above noted basic elements of a flat, or substantially flat rear face 18 on which one or more magnetic mount engagement points 22 can be placed for magnetic mounting, and the inductive charging receiver 20 may also be utilized. Depending on the strength of the magnets utilized, as well as available space of and around the structure on which the dock 10 is mounted, the size and weight of the mobile device 12 may be limited.

The mobile device 12 is attached to the dock 10 in accordance with various embodiments of the present disclosure, and in turn, the dock 10 may be mounted to a structure. Such structures include surfaces within or on a vehicle such as dashboards and windshields, as well as air conditioning vents, tubular structures, and the like. Beyond vehicle installations, the dock 10 may be mounted to other surfaces such as kitchen countertops, desks, shelves, and the like. To this end, the dock 10 may include a structural mount interface 26. With the example shown in FIGS. 1 and 2, the structural mount interface 26 is a joint ball mounted to or otherwise integrally formed with a stalk 28 extending from the dock 10. The joint ball is understood to be engageable to a corresponding joint socket to define a ball-and-socket joint. The joint socket, in turn, may be part of a structure mount that may be detachably coupled to the structure. The structure mount may be a suction cup mount, an adhesive mount, a clamp mount, or any other type of mount that is known in the art.

The embodiments of the present disclosure contemplate the cradle arms 14, and a rotor frame of which it is a part, to rotate about the static inductive charging head 16. Thus, the mobile device 12 mounted thereto may be rotated between a landscape orientation to a portrait orientation, all the while maintaining a wireless charging link with the inductive charging receiver 20. The mobile device 12 can continue to be charged uninterruptedly without removing and inserting charging cables. Furthermore, the mobile device 12 may be readily removed from the dock 10 as desired, with one manual motion stopping both the mechanical connection to the dock 10 as well as the charging link to the inductive charging head 16. The structure of the dock 10 for achieving this functionality will now be described in further detail with additional to the exploded perspective views of FIGS. 4A and 4B.

Figure 4A:
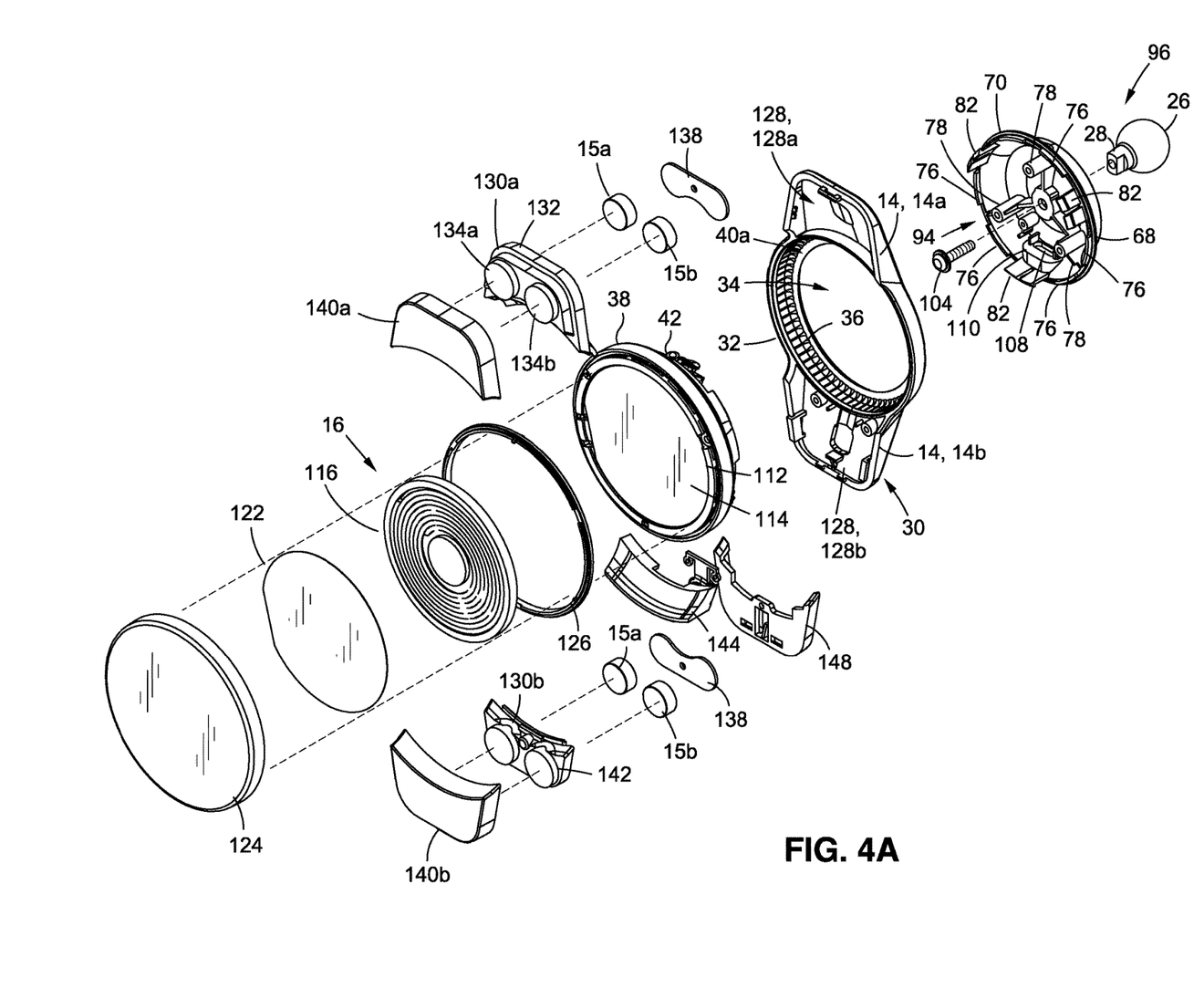
FIG. 4A is an exploded front perspective view of the inductive charger rotatable dock.
Figure 4B:
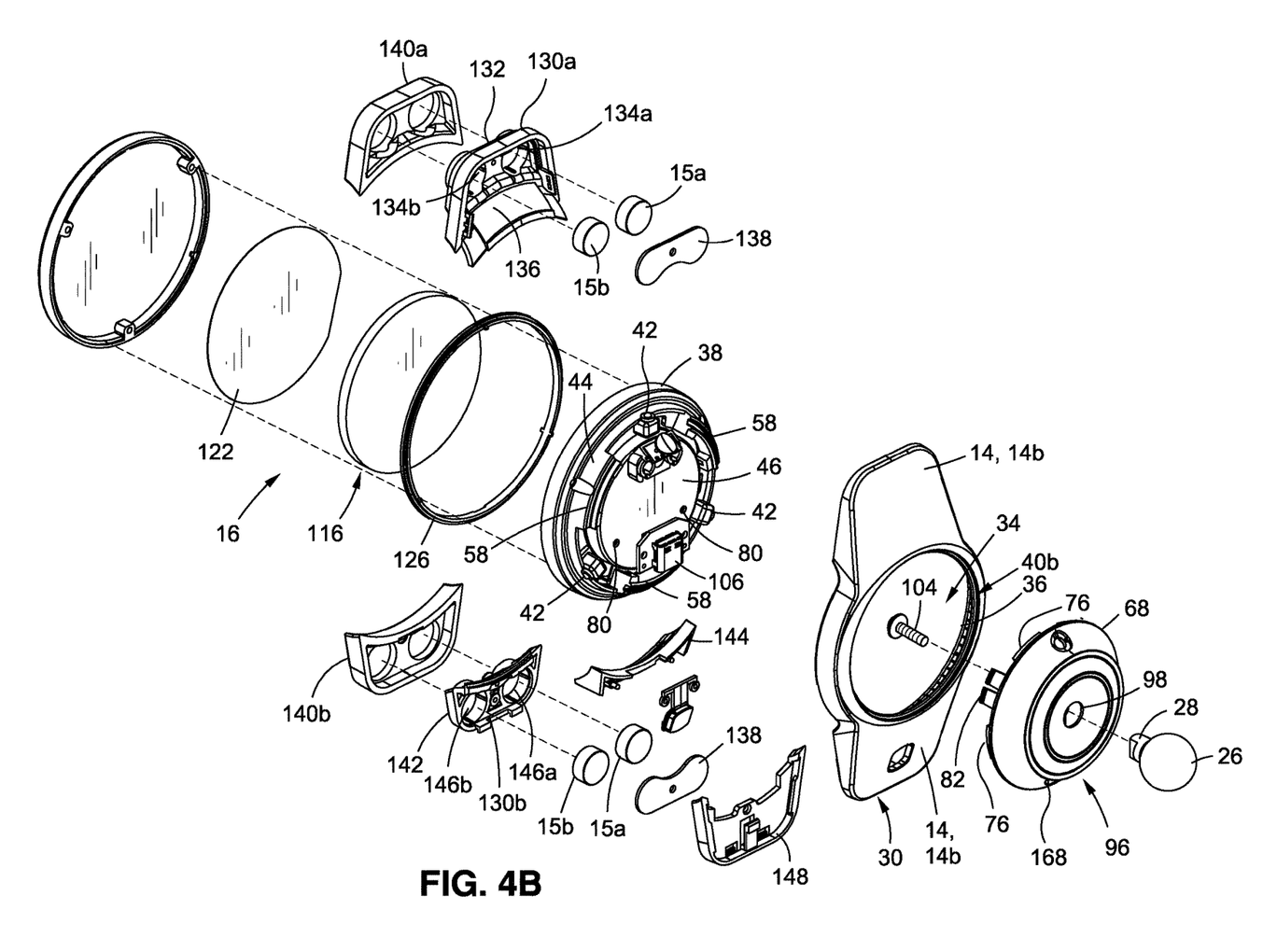
FIG. 4B is an exploded rear perspective view of the inductive charger rotatable dock.

The dock 10 is generally comprised of a rotor frame 30, which may also be referred to as a back plate. The rotor frame 30 has a circular bearing 32 or frame portion, and extending therefrom is the aforementioned pair of opposed cradle arms 14a, 14b. Because the cradle arms 14 incorporate the magnets 15, they may also be referred to as magnet support arms. The cradle arms 14 extend radially from the circular bearing 32, that is, perpendicularly to a circumference of the circular bearing 32 along a central axis as defined by a given radius. As shown, the rotor frame 30 further defines a central opening 34. The circular bearing 32 has an arcuate cross-section with a predefined thickness, and further, an interior circumferential flange 36.

As mentioned above, the cradle arms 14, and by extension, the rotor frame 30 of which they are apart, are rotatably engaged or coupled to the inductive charging head 16. In further detail, the inductive charging head 16 includes a stator base assembly 38 that is received within the circular bearing 32 of the rotor frame 30. With additional reference to the cross-sectional view of FIG. 5A taken along axis X-X of FIG. 2, the interior circumferential flange 36 is defined by a front-facing rim side 40a and an opposed rear-facing rim side 40b. The stator base assembly 38 is positioned opposing the front-facing rim side 40a, and is contemplated to rotate within the circular bearing 32.

Various embodiments further contemplate limiting this rotation of the circular bearing 32, so as to temporarily lock the same into position relative to the inductive charging head 16. To this end, the circular bearing 32 also defines a plurality of detents 41 around the interior circumference thereof. As shown in the cross-sectional view of FIG. 5B taken along axis Y-Y of FIG. 2, these detents 41 are contemplated to engage a set of radially facing projections 42, which may compress against the interior circumference of the circular bearing 32. With sufficient rotational force being applied to the rotor frame 30, the frictional locking force of the projections 42 against the detents 41 can be overcome, allowing the circular bearing 32 to be further rotated.

Figure 6:
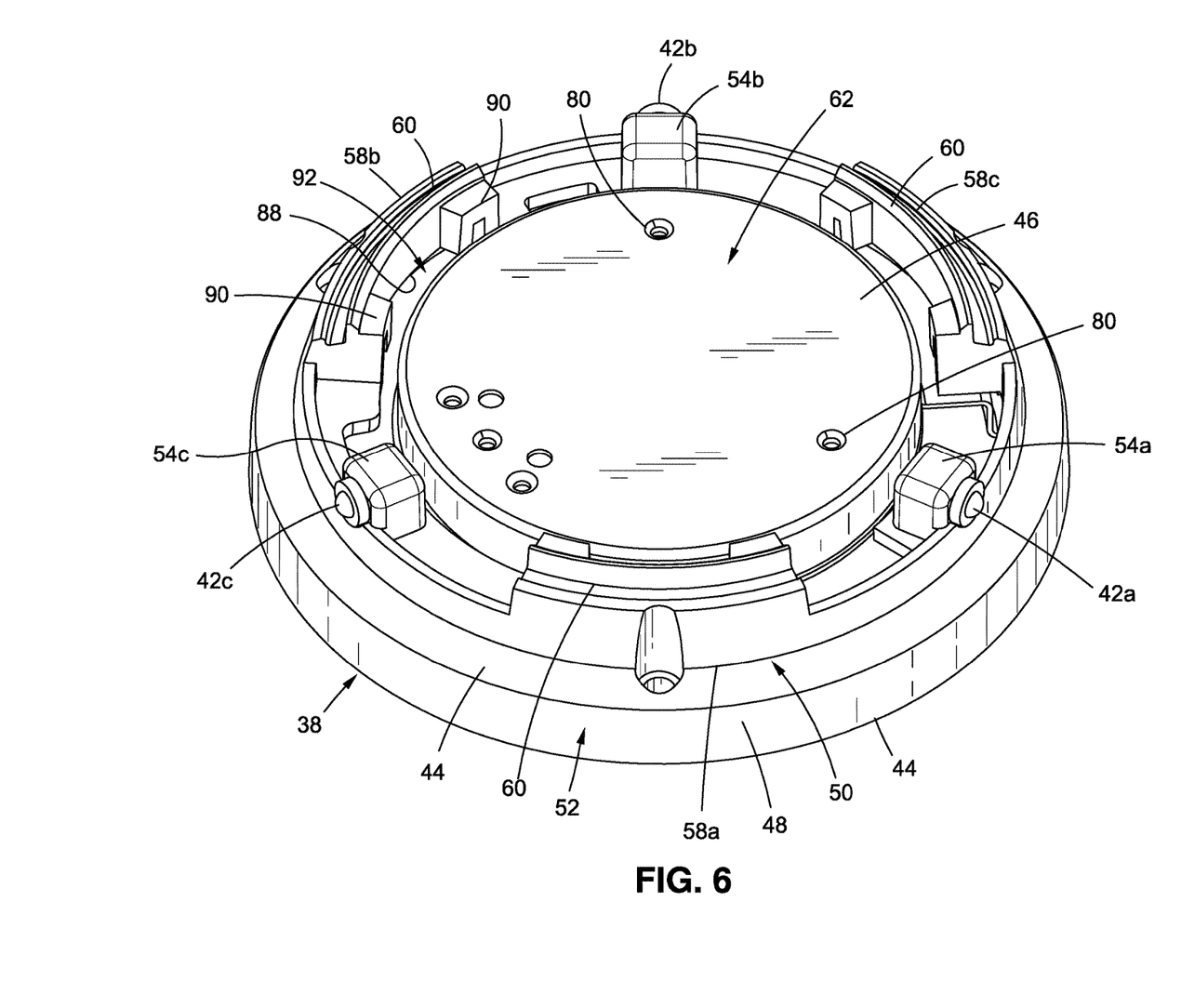
FIG. 6 is a perspective view of a stator base assembly 38 utilized in various embodiments of the inductive charger rotatable dock.

Aside from the contact of the projections 42 to the circular bearing 32, there is understood to be only incidental contact between other parts of the rotor frame 30 and the stator base assembly 38. FIG. 6 illustrates additional details of the stator base assembly 38, which includes a stator base frame 44 and a retainer hub 46. The stator base frame 44 has an annular configuration with a bottom rim portion 48 and a raised inner flange portion 50 that is inset from an outer rim circumference 52. Extending from the raised inner flange portion 50 are a set of projection platforms 54 which may be integrally formed with the stator base frame 44. In particular, there is a first projection platform 54a, a second projection platform 54b, and a third projection platform 54c that are spaced in an equidistant relationship to each other around the raised inner flange portion 50. As best shown in FIG. 4B, the projection platforms 54 each define a respective cross bore 56 that receives the projections 42. The projection platforms 54 are positioned along the edges of the raised inner flange portion 50 such that the projections 42 extend slightly beyond the extent thereof to make contact with the circular bearing 32 of the rotor frame 30. In this regard, it is understood that the edges of the raised inner flange portion 50 do not make contact with the circular bearing 32.

Also extending from the raised inner flange portion 50 are a set of track platforms 58, including a first track platform 58a, a second track platform 58b, and a third track platform 58c. The track platforms 58 thus alternate with the projection platforms 54, with each projection platform 54 being circumferentially centered between one track platform 58 and another. The track platform 58 defines a top transverse groove 60 that has a partial arc dimension generally corresponding to that of the raised inner flange portion 50.

Figure 5A:
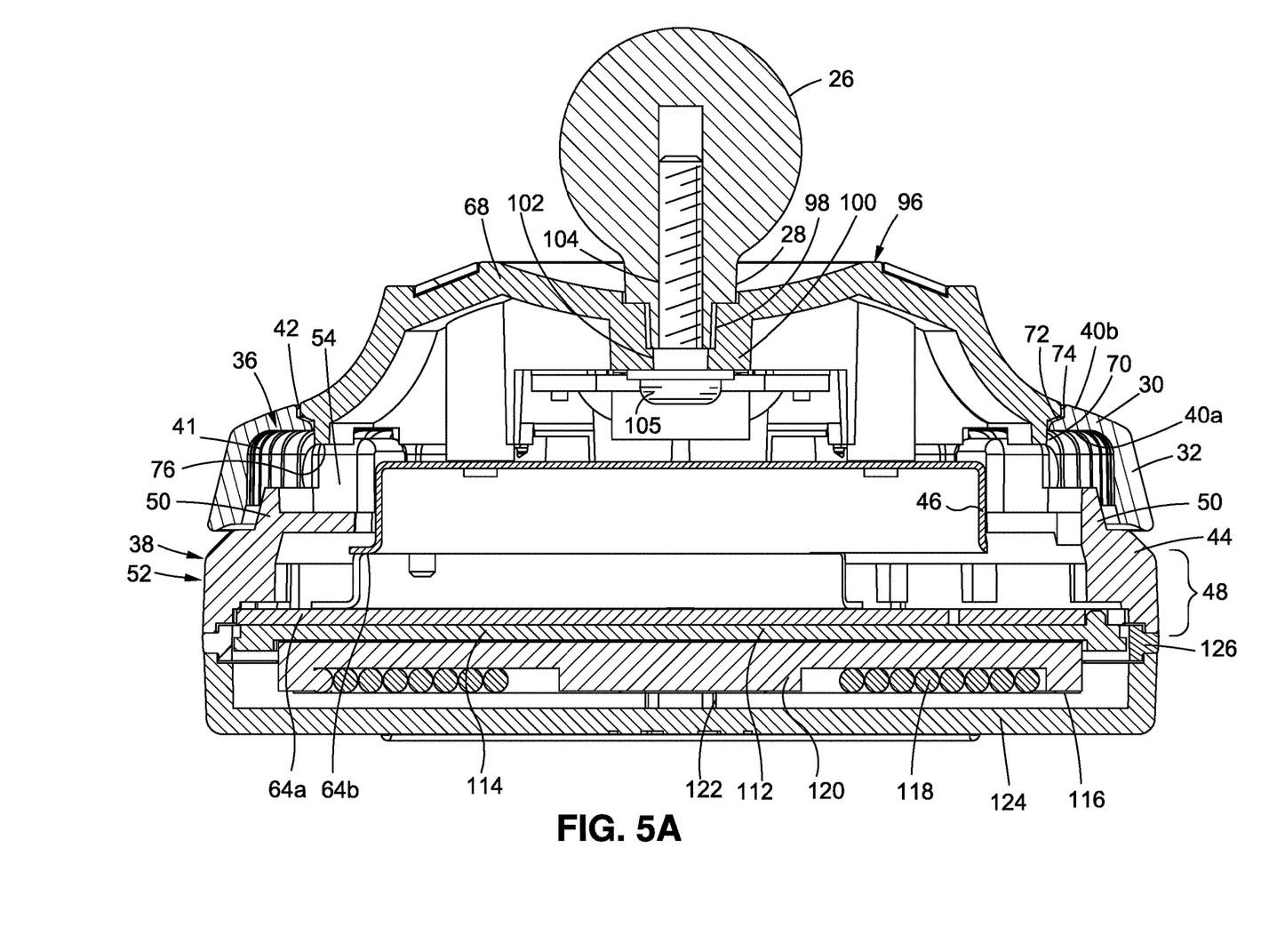
FIG. 5A is a cross-sectional view of an assembled inductive charger rotatable dock taken along axis X-X of FIG. 2.

The stator base frame 44 defines a central opening 62 through which the retainer hub 46 is positioned. More particularly, the retainer hub 46 is a circular disk defined by a series of stepped flange portions, with a bottom rim portion 64a and a middle rim portion 64b, and a central platform 66. The retainer hub 46 is axially aligned with the stator base frame 44. On the other side of the rotor frame 30, that is, the rear-facing rim 40b, there is a stator cap 68 that is coupled or attached to the stator base assembly 38 through the central opening 34 of the circular bearing 32. The stator cap 68 likewise has a circular configuration defined by an outer rim 70 that is in rotating engagement with the rear-facing rim 40b of the circular bearing 32. In further detail, the outer rim 70 is defined by a shoulder 72, while the rear-facing rim 40b of the circular bearing 32 defines an inner flange 74, with the shoulder 72 facing the inner flange 74. Although FIG. 5A shows the shoulder 72 being slightly separated from the inner flange 74, these two surfaces are understood to be in a sliding engagement with each other. The outer rim 70 of the circular bearing 32 further includes a set of circumferentially spaced and arcuately shaped rails 76 that are configured to be received within the top transverse grooves 60 defined on the track platforms 58 of the stator base frame 44. This is envisioned to aid in maintaining the axial alignment of the stator base frame 44 and the stator cap 68.

There is a first modality by which the stator cap 68 is attached to the stator base assembly 38. In particular, the stator cap 68 defines a plurality of spaced apart bosses 78 projecting therefrom. The bosses 78 are each understood to define a fastener through hole 79 that are in alignment with corresponding fastener holes 80 defined on the central platform 66 of the retainer hub 46. The cross-sectional view of FIG. 5B best illustrates the relationship between the boss 78 and the central platform 66. A fastener such as a screw may be inserted from either the retainer hub end or the stator cap end to secure the retainer hub 46 to the stator cap 68.

Figure 5B:
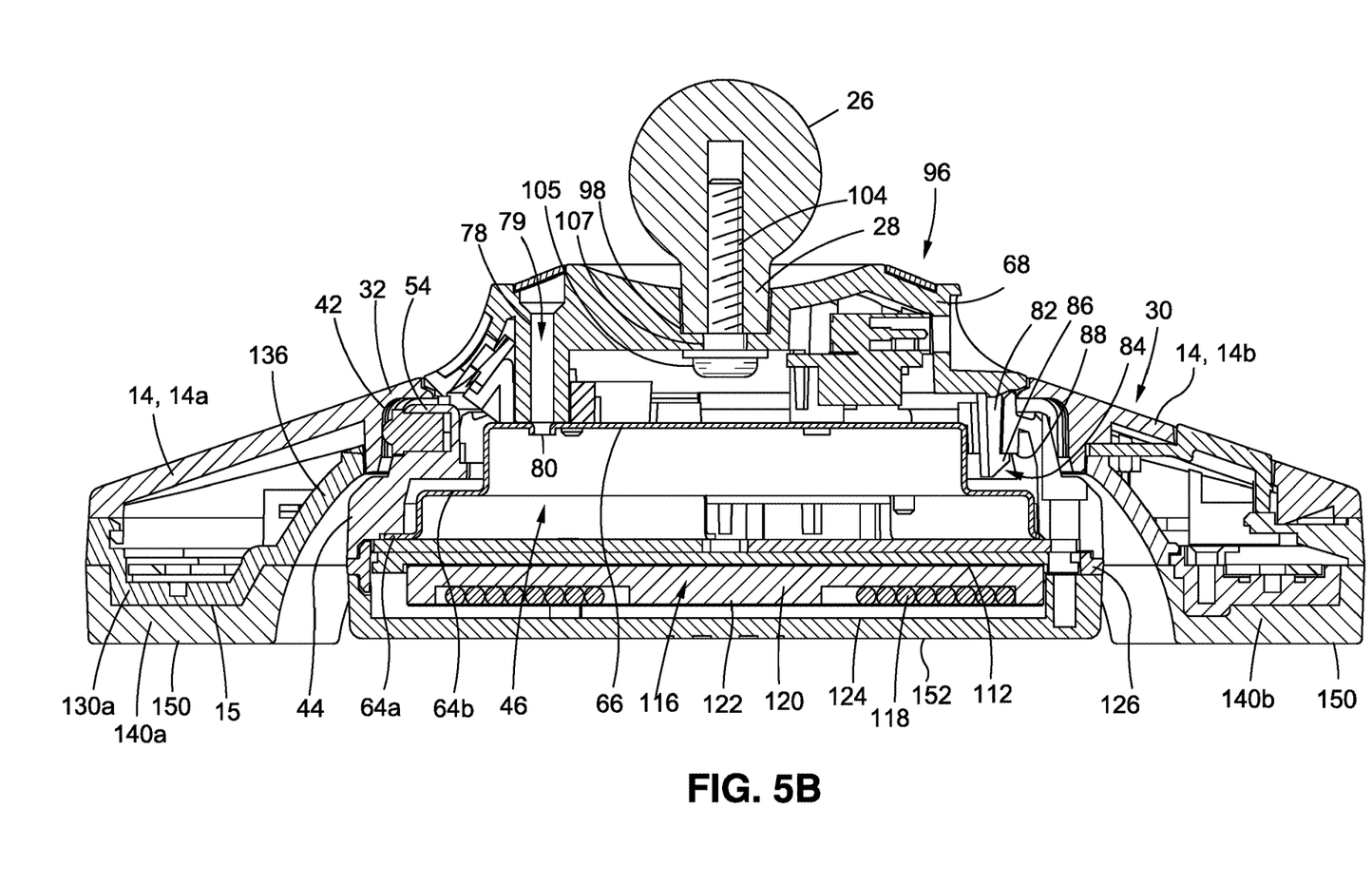
FIG. 5B is a cross sectional view of the assembled inductive charger rotatable dock taken along axis Y-Y of FIG. 2.

A second modality by which the stator cap 68 is coupled to the stator base assembly 38 are a set of spaced apart clips 82 extending therefrom. With particular reference to FIG. 5B, the clips 82 are defined by a wedge end 84 with a hook portion 86 that is configured to engage a bottom lip 88 of the stator base frame 44, and more specifically, as defined by the raised inner flange portion 50. Each of the track platforms 58 extend vertically from the raised inner flange portion 50, and on each opposed ends of the same, a foot 90 extends horizontally and radially inwardly. An opening between the two feet 90 is where the clips 82 are inserted. The wedge end 84 is flexed as it is pressed against inside rim of the track platforms 58, and once the hook portion 86 clears the bottom of the track platform 58, snaps back against the bottom lip 88 with the hook portion 86 being locked thereto. Thus the circumferential width of the clips 82 is understood to be substantially coextensive with the spacing between the two feet 90 defined on the stator base frame 44. Along these lines, the relative position of each of the clips 82 are understood to coincide with the openings 92 defined between the respective feet 90 of the track platforms 58.

Mounted to the rear of the stator cap 68 is the aforementioned structural mount interface 26. In further detail, the stator cap 68 is defined by an interior side 94 from which the aforementioned bosses 78 and clips 82 extend, and an opposed exterior side 96. The center of the stator cap 68 defines a mounting recess 98 through which at least a portion of the stalk 28 is inserted. The interior side 94 defines another boss 100 with a center through-hole 102 extending from the interior side 94 to the exterior side 96. A threaded fastener 104 is inserted from the interior side 94, and engages with the female threading in the structural mount interface 26. The head 105 of the threaded fastener 104 is compressed against the boss 100, thereby coupling the structural mount interface 26 to the stator cap 68.

With reference to FIG. 4B, also mounted to the retainer hub 46 is a power interconnect interface 106. According to one embodiment, the power interconnect interface 106 may be a Universal Serial Bus (USB) port. Any USB port socket type may be utilized such as Type C, Mini Type B, and Micro Type B, though in a preferred, but optional embodiment, the power interconnect interface 106 is a USB Type C socket. With the stator base assembly 38 and the stator cap 68 attached together sandwiching the rotor frame 30, the power interconnect interface 106 is located toward the interior side 96 of the stator cap 68. Thus, as best shown in FIG. 4A, defined by the stator cap 68 is a bottom-facing opening 108. There may also be an engagement platform 110 that mechanically supports the power interconnect interface 106.

The power transmission pin of the power interconnect interface 106 may be electrically connected to a printed circuit board 112 that is mounted to the bottom of the retainer hub 46. The printed circuit board 112 may incorporate integrated circuits utilized in an implementation of the Qi charging system, such as the above-mentioned power conversion unit, the communications and control unit, and the like. In order to fit within the interior of the retainer hub 46, the printed circuit board 112 is understood to be shaped circularly, though this is by way of example only and not of limitation. In addition to the printed circuit board 112 being positioned within the bottom rim portion 48 of the retainer hub 46, the printed circuit board 112 is mounted to a circular mounting board 114 as illustrated in the cross-sectional view of FIG. 5A. Additional details regarding the circular mounting board 114 will be considered below.

The dock 10 has inductive charging features, and accordingly the inductive charging head 16 includes an charging coil assembly 116 therefor. Specifically, the charging coil assembly 116 is comprised of an inductive coil 118 and a coil frame 120 to which the inductive coil 118 is mounted. The coil frame 120 mechanically, and to a certain extent, electromagnetically isolates the inductive coil 118 from the printed circuit board 112 to avoid interference while an electromagnetic field is being generated thereby. The ends of the inductive coil 118 are electrically connected to the charging circuit mounted to the printed circuit board 112. As indicated above, the embodiments of the dock 10 may implement the Qi wireless charging standard, and therefore the size and configuration of the inductive coil 118 is likewise understood to correspond thereto. Exposed wire of the inductive coil 118 may be disposed toward the front face of the inductive charging head 16 to maximize power transfer to the counterpart inductive charging receiver. There may additionally be a protective sheet panel 122 with a circular configuration positioned in front of the inductive coil 118 for retention purposes.

The inductive charging head 16 further includes a head cover 124 that is fitted over the charging coil assembly 116 and coupled to the stator base assembly 38. In one embodiment, there may be a connector bezel 126 between the head cover 124 and the stator base assembly 38. It is possible to configure the connector bezel 126 as a light guide that is in optical communication with an illumination driver, e.g., a light emitting diode, on the printed circuit board 112. The connector bezel 126, then, may generate different light outputs that vary in color and pulsing pattern. For example, the connector bezel 126 may be flashed in red color while the mobile device 12 is being actively charged. Once charging is complete, the connector bezel 126 may be illuminated a steady green color. Other outputs corresponding to different operational statuses may be incorporated, and deemed to be within the purview of those ordinary skilled in the art.

The cradle arms 14 each define cavities 128 that hold the magnets 15. In further detail, the first or upper cradle arm 14a is engageable to a first magnet receptacle 130a that is defined by a receptacle frame 132, a left magnet slot 134a, and a right magnet slot 134b. A left magnet 15a is received within the left magnet slot 134a, and a right magnet 15b is received within the right magnet slot 134b. The first magnet receptacle 130a is understood to incorporate an integrated arm fillet cover 136, though this is optional, as will be illustrated in a different embodiment in which the arm fillet cover 136 is separate. The arm fillet cover 136 may be configured to conform to the outer curvature of the stator base assembly 38. A rear magnet cover 138 encloses the magnets 15 within the respective magnet slots 134. The assembly comprising the receptacle frame 132, the magnets 15, and the rear magnet cover 138 is disposed within the first cavity 128a, and a first arm cover 140a is attached to the upper cradle arm 14a.

The second or lower cradle arm 14b is engageable to a second magnet receptacle 130b defined by a receptacle frame 142 that is configured slightly differently than the receptacle frame 132 of the first magnet receptacle 130a described above. Namely, there is no integrated arm fillet cover, but there is a separable/separate arm fillet cover 144. The second magnet receptacle 130b similarly includes a left magnet slot 146a and a right magnet slot 146b that receive the left magnet 15a, and the right magnet 15b, respectively, and secured into position with another rear magnet cover 138. The assembly of the second magnet receptacle 130b, the magnets 15, and the rear magnet cover 138 is mounted to an arm platform 148. In turn, the arm platform 148 is attached to the second or lower cradle arm 14b. Mounted over the second magnet receptacle 130b is a second arm cover 140b.

The cradle arms 14, and specifically the arm covers 140 attached thereto, each define a device engagement surface 150 that contacts the magnetic mount engagement points 22 of the mobile device 12 when mounted. In this regard, the arm covers 140 may be made of a non-scratch, flexible, and/or elastomeric material that can impart an frictional retention force upon the magnetic mount engagement points 22. The inductive charging head 16 also defines a head face 152 that is opposite the inductive charging receiver 20 of the mobile device 12 when it is mounted to the cradle arms 14. The head face 152, however, is not understood to make contact with the cover of the mobile device 12, and spaced slightly apart. Thus, the head face 152 is set back from the device engagement surface 150 of the arm covers 140, or alternatively stated, the device engagement surface 150 extends outwardly further than the head face 152. In this way, when turning the mobile device 12 with it being mounted to the rotor frame 30, no frictional resistance from the inductive charging head 16 is encountered. However, the head face 152 is understood to be sufficiently proximal to the inductive charging receiver 20 to still achieve the electromagnetic interaction that allows for the wireless transfer electrical power to the mobile device 12.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A magnetic mount for an electronic device with an inductive charging receiver and one or more engagement points, the
   a static inductive charging head including an inductive coil delivering a charging current to the electronic device with the inductive charging receiver being in axial alignment with the inductive coil; and
   a back plate with a circular frame in rotating engagement with the static inductive charging head, and one or more magnet support arms on which permanent magnets are mounted in a spaced, offset relationship to the static inductive charging head and to magnetically couple with the one or more engagement points on the electronic device.

2. The magnetic mount of claim 1, further comprising a structural mount interface extending from the static inductive charging head.

3. The magnetic mount of claim 1, wherein the circular frame is defined by a flanged central opening with a front end and a back end.

4. The magnetic mount of claim 3, wherein the static inductive charging head includes a stator base that faces the front end of the circular frame and is in a rotating engagement therewith, and a stator cap that is coupled to the stator base, faces the rear end of the circular frame, and is in a rotating engagement therewith.

5. The magnetic mount of claim 1, further comprising a power interconnect interface attached to the static inductive charging head and including an electrical connection to the inductive coil.

6. The magnetic mount of claim 1, wherein:
the static inductive charging head defines a front face;
the magnet support arms each define a device engagement face; and
the front face of the static inductive charging head is set back from the device engagement face of the magnet support arms.

7. The magnetic mount of claim 1, wherein:
the circular frame defines a plurality of detents around an interior circumference thereof; and
the static inductive charging head includes one or more radially facing projections spaced around an outer perimeter thereof, each projection being engageable to one of the plurality of detents defined by the circular frame to limit rotational movement of the back plate.

8. An inductive charging dock, comprising:
a rotor frame with an interior circular bearing rim and one or more magnet support arms extending radially outwards;
a stator base to which the rotor frame is rotatably engaged within the circular bearing rim thereof, the stator base including a structural mount interface;
an inductive charging coil disposed on the stator base; and
one or more permanent magnets mounted to each of the one or more magnet support arms.

9. The inductive charging dock of claim 8, wherein the circular bearing rim defines a plurality of first engagement elements, and the stator base includes a plurality of corresponding second engagement elements cooperating with the first engagement elements to limit rotational movement of the rotor frame within the stator base.

10. The inductive charging dock of claim 9, wherein the first engagement elements are detents, and the second engagement elements are projections.

11. The inductive charging dock of claim 8, further comprising a power interconnect interface attached to the stator base and including an electrical connection to the inductive charging coil.

12. The inductive charging dock of claim 11, wherein the power interconnect interface is a Universal Serial Bus (USB) port.

13. The inductive charging dock of claim 11, further comprising an inductive charging circuit selectively delivering electrical power to the inductive charging coil.

14. The inductive charging dock of claim 13, further comprising an indicator light connected to the inductive charging circuit, predefined outputs on the indicator light being generated in response to corresponding charging circuit statuses as evaluated by the inductive charging circuit.

15. The inductive charging dock of claim 8, further comprising:
a stator cover attached to the inductive charging coil and defining a stator face; and
magnet covers attached to each of the magnet support arms and defining a device engagement face.

16. The inductive charging dock of claim 15, wherein the device engagement face extends outwardly further than the stator face.

17. The inductive charging dock of claim 8, wherein the structural mount interface is a first rotatable member engageable with a corresponding second rotatable member mountable to a structure.

18. The inductive charging dock of claim 8, wherein the one or more permanent magnets are spaced offset from the inductive charging coil.

19. The inductive charging dock of claim 8, further comprising a stator cap coupled to the stator frame, the stator cap and the stator frame together retaining the rotor frame in a sandwiched relationship.

* * * * *